W. H. MITCHELL.
CHAIN MAT FOR WHEEL TIRES.
APPLICATION FILED OCT. 8, 1915.
1,311,989.
Patented Aug. 5, 1919.
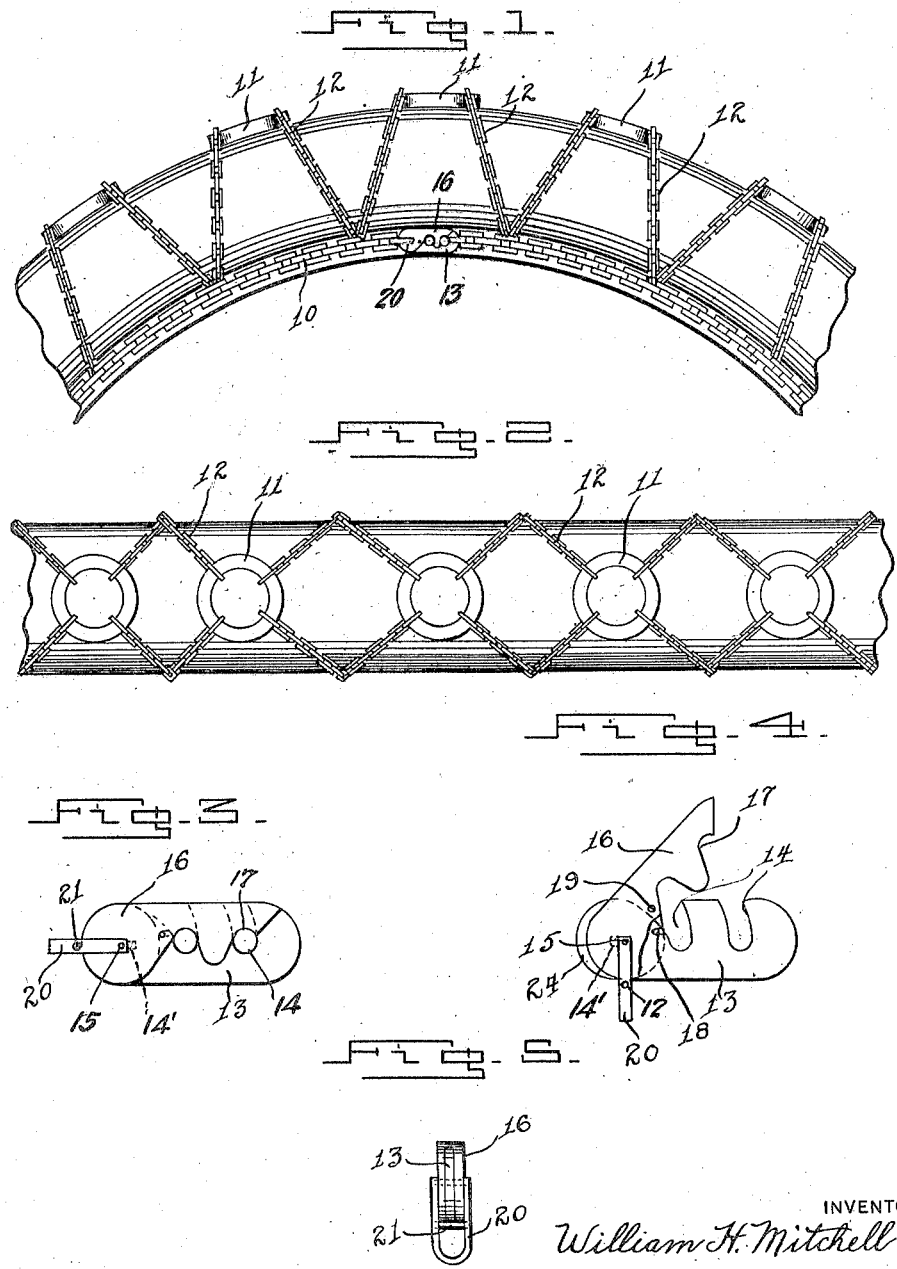
INVENTOR
William H. Mitchell
WITNESSES
BY
ATTORNEY

UNITED STATES PATENT OFFICE.

WILLIAM H. MITCHELL, OF EAST ST. JOHNSBURY, VERMONT.

CHAIN MAT FOR WHEEL-TIRES.

1,311,989.     Specification of Letters Patent.     Patented Aug. 5, 1919.

Application filed October 8, 1915. Serial No. 54,844.

*To all whom it may concern:*

Be it known that I, WILLIAM H. MITCHELL, a citizen of the United States, residing at East St. Johnsbury, in the county of Caledonia and State of Vermont, have invented certain new and useful Improvements in Chain Mats for Wheel-Tires, of which the following is a specification.

This invention relates to an improved anti-slipping device for pneumatic or cushion tire vehicle wheels and has for its object the production of a chain that can easily and quickly be placed on a tire or taken therefrom.

Another object of this invention is to provide a novel form of locking hook that is applied to the side chains of the mat which will draw the same tightly over the tire and positively prevent the accidental displacement of the mat from the tire.

A still further object of this invention is to provide an anti-slipping device that is simple in construction, efficient in operation, and consists of a minimum number of parts.

With these and other objects in view, this invention resides in certain novel features of construction, combination and arrangement of parts, as will be hereinafter more fully described and shown in the accompanying drawings wherein:—

Figure 1 is a view in elevation of a portion of a tire with the improved device mounted thereon;

Fig. 2 is a top plan view of a portion of a tire equipped with the improved mat;

Fig. 3 is a side elevation of the hook used with this device in a closed position;

Fig. 4 is a view similar to Fig. 3 with the hook in an open position;

Fig. 5 is a view in end elevation of the improved hook.

Referring to the parts by reference numerals, this mat comprises a pair of side chains 10, a plurality of rings 11 that are adapted for placement on the tread of the tire and a plurality of connecting chains 12 that are attached to the rings 11 and radiate in divergent relation therefrom to be attached to the side chains 10. These chains 10 and 12 are made of any preferred type of links and the rings 11 are preferably flat so as not to mutilate the tread of the tire.

There is provided with this device, an improved form of locking means, the same being attached to the ends of the side chains 10, it being understood that these side chains 10 extend entirely around the sides of the tire bringing the extremities thereof into close proximity. These locking members each comprise a body portion 13 that is provided with a plurality of cut-away portions or notches 14 and a slot 14' as indicated in Figs. 3 and 4 is formed adjacent one end thereof. Pivotally secured to the body 13 by means of a pin 15 passing through the slot aforementioned is a latch 16 that is also provided with a plurality of cut-away portions or notches 17. Running from one of the notches 14 of the body portion 13 is a locking pocket 18 and carried by the latch 16 is a pin 19 for engagement in this pocket 18. The retaining lever 20, the same being substantially U-shaped, is attached to the protruding ends of the pin 15 that is rigidly carried by the latch 16 and has secured thereto, an abutment dog 21. One of the extremities of the side chains 10 is attached to the U-shaped lever 20 and the other end of the chain is positioned in one of the cut-away portions or slots 14 in the body 15 and the latch 16 is then moved to the position as shown in Figs. 1 and 3, the complemental notches 17 allowing for its placement as thus shown, in that room is provided for the link of the chain 10 that is in connection with the body 13. When the latch 16 is moved so as to aline the pin 19 with the pocket 18, the lever 20 is then moved to a position as shown in Fig. 3, the abutment dog 21 thereof engaging the end of the body 13 designated by the numeral 24 thus moving the body 13 relative to the latch 16 thereby positioning the pin 19 in the pocket 18. When the locking means is closed, that is in a position as shown in Fig. 3, it is impossible to move the latch 16 to a position as shown in Fig. 4 until the pin 19 is removed from the pocket 18 and the said pin can only be removed from the pocket by returning the lever 20 to a position as shown in Fig. 4 and the latch 16 and body 13 moved relatively in a longitudinal direction.

It is obvious that minor changes may be made in the form and construction of this device without departing from the material parts thereof. It is, therefore, not wished to confine the invention to the exact form and construction herein shown and claimed, but it is wished to include all such as properly comes within the scope claimed.

What is claimed is:—

A hook, comprising an elongated body having a rounded end and lateral notches along an edge thereof, and having a centrally disposed slot in the rounded end and a pocket in the edge thereof opening into the adjacent lateral notch, a pivotal and longitudinally movable latch disposed at one side of the body and closing the lateral notches thereof, a U-shaped member, a pivot connecting the ends of the U-shaped member and passing through the latch and longitudinal slot of the body, an element connecting the parts of the U-shaped member and adapted to ride on the rounded end of the body and effect a longitudinal movement of the latch, and a pin carried by the latch to enter the pocket formed in the edge of the rounded end of the body and held therein by the action of the U-shaped member and the element carried thereby engaging the rounded end of the body.

In testimony whereof I affix my signature in presence of two witnesses.

WILLIAM H. MITCHELL.

Witnesses:
F. F. REED,
ARTHUR B. CARR.